United States Patent [19]

Harding

[11] 3,944,703

[45] Mar. 16, 1976

[54] FIBROUS BATTS IMPREGNATED WITH AQUEOUS DISPERSIONS BASED ON HEAT-HARDENABLE PHENOLIC RESINS

[75] Inventor: James Harding, Green Brook, N.J.

[73] Assignee: Union Carbide Corporation, New York, N.Y.

[22] Filed: Feb. 20, 1975

[21] Appl. No.: 551,237

Related U.S. Application Data

[60] Continuation-in-part of Ser. No. 466,790, May 3, 1974, abandoned, which is a division of Ser. No. 239,316, March 29, 1974, Pat. No. 3,823,103, which is a continuation-in-part of Ser. No. 164,819, July 21, 1971, abandoned.

[52] U.S. Cl. .............. 428/288; 428/260; 428/264; 428/268; 428/288; 428/378; 260/17.2; 260/38
[51] Int. Cl.² .................. B32B 17/02; C08G 51/18
[58] Field of Search .......... 428/228, 260, 264, 268, 428/288, 378; 260/17.2, 38

[56] References Cited

UNITED STATES PATENTS

| | | | |
|---|---|---|---|
| 3,207,652 | 9/1965 | Shannon | 428/378 |
| 3,594,268 | 7/1971 | Dahms et al. | 428/264 |
| 3,823,103 | 7/1974 | Harding | 106/205 |

*Primary Examiner*—George F. Lesmes
*Assistant Examiner*—William R. Dixon, Jr.
*Attorney, Agent, or Firm*—Charles J. Metz

[57] ABSTRACT

Aqueous dispersions of heat-hardenable phenolic resins are disclosed. They are characterized by excellent stability and by a low Pollution Index; they are capable of being infinitely diluted with water, and they are especially desirable for use in applications wherein mineral fibers are sprayed with the aqueous dispersions and subsequently formed into mineral fiber batts.

5 Claims, No Drawings

FIBROUS BATTS IMPREGNATED WITH AQUEOUS DISPERSIONS BASED ON HEAT-HARDENABLE PHENOLIC RESINS

This application is a continuation-in-part of application Ser. No. 466,790, now abandoned filed May 3, 1974, which was a division of application Ser. No. 239,316, filed March 29, 1974, now U.S. Pat. No. 3,823,103, which was a continuation-in-part of application Ser. No. 164,819, filed July 21, 1971, now abandoned.

The invention relates to aqueous dispersions based on heat-hardenable phenolic resins. More particularly, the invention relates to aqueous dispersions of heat-hardenable phenolic resins, which are characterized by excellent stability and by a low pollution index, and which are capable of being infinitely diluted with water. In view of the properties noted above and, also, in view of the excellent adhesion to glass, when cured, the aqueous dispersions of this invention have particular utility in applications wherein mineral fibers are sprayed with the aqueous dispersions and subsequently formed into mineral fiber batts and other such compacted structures.

Mineral fiber batts and other such compacted structures, which have found wide acceptance in the fields of thermal and acoustical insulation, have been produced by first blowing a stream of molten glass or slag with high pressure steam in such a manner that the glass or slag stream is drawn into fibers of random lengths. The fibers, while in transit in a forming hood or blow chamber, and while still at elevated temperatures from the drawing operation, have then been sprayed with an aqueous solution of a heat-hardenable phenolic resin and thereafter allowed to settle into a continuous mat on an endless foraminous conveyor belt. Generally, there is sufficient residual heat in the mineral fibers to volatilize substantially all of the water from the "phenolic" binder, leaving the binder on the fibers in a viscous or semi-viscous state. The sprayed fibers, in the form of a batt, have been transferred to a curing oven, heated by air which is at relatively high temperatures, about 400°F and which is blown through the batt. The relatively high temperatures involved effect a cure of the binder to an infusible state.

At the relatively high temperatures employed in this process, the low molecular weight components of the water-soluble phenolic resin tend to volatilize, escape to, and polute the atmosphere. Consequently, the use of water-soluble, heat-hardenable phenolic resins as binders in the production of fiber batts, is being severely restricted in view of the current pollution standards now in effect in may areas of the country.

Attempts to utilize phenolic resins made up of molecules of higher molecular weight, in the form of aqueous dispersions, in order to minimize volatilization have not proved to be particularly successful. Such dispersions have poor stability characteristics as the phenolic resin thereof settles out within a few minutes after preparation, coalescing into a continuous resin phase. Furthermore, such dispersions cannot be diluted with water to a consistency suitable for use in spray applications.

The present invention provides aqueous dispersions which can be successfully used in the production of mineral fiber batts by a spray operation, the dispersions being characterized by excellent bonding and application efficiency. The aqueous dispersions of this invention exhibit a tensile strength of at least about 300 psi when tested according to the Glass Adhesion Test described subsequently in this specification. Also, the aqueous dispersions remain stable for periods of time in excess of about 2 weeks, that is, the phenolic resin particles thereof do not settle out into a continuous resin phase. Consequently, the dispersions can be prepared, shipped to the ultimate user, and stored for extended periods of time. Further, the aqueous dispersions of this invention can be infinitely diluted with water to any desired concentration of phenolic resin solids with substantially no change in the size and uniformity of the dispersed resin particles. Furthermore, the aqueous dispersions of this invention retain the excellent properties discussed above, and also retain their flow and gel properties for extended periods of time, in contrast to the water-soluble phenolic resins. Also, the aqueous dispersions of this invention have a pollution index of less than about 6 percent, which is acceptable from an environmental standpoint, based on standards currently in force.

The aqueous dispersions of this invention contain a heat-hardenable phenolic resin having a weight average molecular weight of at least about 400, generally about 500 to about 3000, and preferably about 500 to about 2000.

Particularly desirable aqueous dispersions are those having a gel time of not more than about 180 seconds, generally about 10 to about 170 seconds, preferably about 20 to about 150 seconds, and more preferably about 30 to about 100 seconds, wherein the heat-hardenable phenolic resin thereof has a weight average molecular weight as defined above and wherein substantially all of the resin particles have a diameter of less than about 60 microns. Even more desirable aqueous dispersions are those as defined in the preceding paragraph wherein the resin particles have a diameter on average of about 5 to about 20 microns with substantially all resin particles having a diameter less than about 40 microns.

The heat-hardenable phenolic resins, used to produce the aqueous dispersions of this invention are resole resins obtained by condensing a phenol with an aldehyde in the presence of an alkaline catalyst.

Among suitable phenols which can be condensed with an aldehyde to produce phenol-aldehyde "resole" resins are the monohydric as well as the polyhydric phenols.

Among suitable monohydric phenols can be noted; phenol and those phenols having the general formula:

FORMULA I

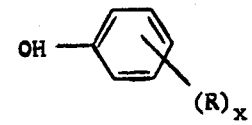

wherein $x$ is an integer having a value of 1 to 2 inclusive, each R, which can be the same or different, is an alkyl radical containing from 1 to 9 carbon atoms inclusive, an alkoxy radical containing from 1 to 9 carbon atoms inclusive, or a halogen, e.g., chlorine, bromine and iodine; with the proviso that at least three positions other than meta to the hydroxyl group are unsubstituted.

Specific phenols falling within the scope of Formula I are: alkylated phenols, exemplary of which are m-cresol, m-ethylphenol, m-propylphenol, m-isopropylphenol, m-sec-butylphenol, m-amylphenol, m-hexylphenol, m-nonylphenol and other like phenols, as well as the commercially available meta-cresol which contains small amounts of both the para and the ortho isomers; alkoxylated phenols, exemplary of which are m-methoxyphenol, m-ethoxyphenol, m-propoxyphenol, m-hexoxyphenol, 3,5-dimethoxyphenol, and the like; halogenated phenols such as meta-chlorophenol, meta-bromophenol, and the like.

Among suitable polyhydric phenols can be noted resorcinol, and the like, as well as polyhydric, polynuclear phenols having the formula:

FORMULA 2

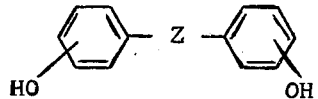

wherein Z is a divalent radical, as for example, sulfur, oxygen, alkylidene, alkylene and the like; and also substituted derivatives of phenols falling with the scope of Formula 2.

Exemplary of specific polyhydric, polynuclear phenols are the following: bis(hydroxyphenyl)alkanes such as 2,2-bis(4-hydroxyphenyl)propane, commonly referred to as Bisphenol A, 2,4'-dihydroxyldiphenylmethane, dihydroxydiphenyl sulfone and the like.

Also small amounts of di- and/or mono-functional phenols such as p-nonylphenol and 2,5-di-tert-butylphenol can be used in conjunction with tri and higher functional phenols, illustrated above, to produce suitable phenolic resins for purposes of this invention.

Examples of aldehydes which can be condensed with the phenols listed above to produce the phenol-aldehyde resins are: formaldehyde in any of its available forms, i.e., formalin and para-formaldehyde; furfural, and the like.

The amount of aldehyde used to prepare the heat-hardenable or resole resins of this invention is at least about 0.9 mole per mole of phenol, generally about 1 to about 3 moles, and preferably about 1.2 to about 2.5 moles per mole of phenol.

As previously stated, the condensation of a phenol and an aldehyde is carried out in a reaction medium containing an alkaline catalyst. Illustrative of suitable catalysts are the following: alkali metal and alkaline earth metal hydroxides or oxides, as for example, sodium hydroxide, potassium hydroxide, calcium hydroxide, calcium oxide, barium hydroxide, barium oxide and the like, or an amine such as hexamethylenetetramine or ammonia.

Particularly desirable resins for purposes of this invention are those produced using barium hydroxide as a catalyst. An aqueous dispersion of such resin when applied to mineral fibers and cured, exhibits an unusually high degree of adhesiveness thereto.

The amount of catalyst used in producing the resole resins is about 0.01 to about 0.1 mole per mole of phenol, preferably about 0.02 to about 0.05 mole per mole of phenol. For a detailed discussion of condensates produced from a phenol and an aldehyde and methods for the production thereof, reference is made to the following:

"Phenolic Resins" by W. A. Keutgen ENCYCLOPEDIA OF POLYMER SCIENCE & TECHNOLOGY Volume 10, pages 1–73 Published by Interscience, John Wiley - 1969

The preparation of the aqueous dispersions of this invention can be carried out by a number of convenient methods, for example by condensing a phenol with an aldehyde in a reaction mixture containing an alkaline catalyst to produce a heat-hardenable phenolic resin, adding to the mixture a mixture of "gums", as will be described subsequently, and adjusting the pH of the resultant mixture, if necessary, to less than about 8, generally to a pH of about 3 to about 7.5, and preferably to a pH of about 4.5 to about 6.5, and then condensing (bodying) the resin, if necessary, to a weight average molecular weight as previously described.

Alternatively, the pH of the mixture can be adjusted, if necessary, prior to the addition of the gums, the gums then added and the resin then bodied as indicated above. Also, the gums can be added, along with the phenol, aldehyde, and alkaline catalyst, into the reaction flask, and this mixture can then be condensed and bodied, as described above.

With each of the methods described, the aqueous dispersion produced has a pH of less than about 8 generally about 3 to about 7.5 and preferably about 4.5 to about 6.5.

The gums which are used to prepare the aqueous dispersions are a mixture of gum arabic and one or more of the following gums: (1) a polysaccharide having mannose and galactose units, particularly desirable examples of such polysaccharides being a guar gum, a locust bean gum, and the like (Guar gums are available commercially from Stein Hall & Co. under the designation "Jaguar" gums); (2) a polysaccharide having D-mannuronic acid and L-guluronic acid units, particularly desirable examples of such polysaccharides being algin gum, and the like; and (3) gum carageenan.

The combined weight of the gums used in producing the aqueous dispersions is about 0.5 to about 12, preferably about 0.5 to about 10 and more preferably about 1.2 to about 4.5 parts by weight, based on each 100 parts by weight "phenol" used in producing the heat-hardenable phenolic resin. The weight ratio of gum arabic to the other recited gums is about 0.5 to about 20 to 1, preferably about 0.5 to about 16 to 1 and more preferably about 1 to about 5 to 1.

The production of the dispersions of this invention is further exemplified by the Examples noted in the specification wherein the gums are utilized in the form of aqueous solutions or in the dry form.

In utilizing the dispersions of this invention for mineral fiber bonding by a "spray" application wherein the solid resin content is of the order of about 2 to about 20 percent by weight, it is customary to add thereto such additives as flame-retardants, exemplary of which are urea and the like, silane coupling agents and other additives well known in the art. Silane coupling agents are generally used in amounts of about 0.1 percent to about 0.5 percent by weight based on the solids content of the aqueous dispersion. Among suitable silanes are the trialkoxy amino alkyl silanes wherein a nitrogen atom thereof is separated from a silicon atom by a least three sequential carbon atoms. Specific silanes are the following:

| | |
|---|---|
| $H_2NCH_2CH_2CH_2Si(OCH_3)_3$ | - gamma-aminopropyl trimethoxy silane; |
| $H_2NCH_2CH_2\overset{H}{N}CH_2CH_2CH_2Si(OCH_3)_3$ | - N(beta-aminoethyl-gamma-amino-propyl trimethoxy silane; |
| $H_2NCH_2CH_2\overset{H}{N}CH_2CH_2\overset{H}{N}CH_2CH_2CH_2Si(OCH_3)_3$ | - N(beta-ethylene diamino-ethyl)-gamma-amino propyl trimethoxy silane; |
| $H_2NCH_2CH_2CH_2Si(OC_2H_5)_3$ | - gamma-aminopropyl triethoxy silane; |
| $H_2NCH_2\overset{CH_3}{\underset{|}{C}H}CH_2Si(OC_2H_5)_3$ | - gamma-amino-2-methyl propyl triethoxy silane; and |
| $H_2N(CH_2)_4Si(OCH_3)_3$ | - delta-amino butyl trimethoxy silane |

A particularly desirable silane is one used in carrying out the Glass Adhesion Test.

Although the aqueous dispersions of this invention have been described primarily in relation to "spray" applications to produce mineral fiber batts suitable as thermal and acoustical insulation, the aqueous dispersions can be used as laminating varnishes, additives to paper and other cellulosic pulp and in general, in bonding applications, to bond together organic and inorganic particles and fibers.

In the following examples, which are illustrative of the present invention, properties noted therein were determined by the following procedures.

Gel Time - determined by placing a two gram sample of the aqueous dispersion on a hot plate which was at a temperature of 150°C. The resin was stroked with a spatula and the time required to reach a "no string" condition noted and reported as the Gel Time. A "no string" condition is reached when there is no pulling of strings of the material, by the spatula, from the main body of the resin.

Pollution Index - determined by weighing a two gram sample of the dispersion into a weighed tin. To the sample, there was then added 15 ml. analytical grade methanol and the contents of the tin thoroughly mixed. The tin, containing the sample, was placed in a 300°F oven for 2 hours. At the end of the two hour period, the tin was removed from the oven and placed in a desiccator where the tin and the residue cooled to room temperature. The tin, containing the residue, was weighed and the weight of the residue recorded. Tin and residue were then placed in a 450°F oven for 20 minutes. The tin, with the residue therein, was removed from the oven, cooled to room temperature in a desiccator and reweighed. Percent weight loss of the residue, resulting from the heating cycle in the 450°F oven was calculated and reported as the Pollution Index. A pollution Index below about six percent is acceptable from an environmental standpoint.

Glass Adhesion Test - the composition to be tested, based on the aqueous dispersion of Example I had the following formulation:

| | GRAMS |
|---|---|
| dispersion of Example 1 | 34.38 |
| ammonium sulfate (accelerator) | 0.2 |

-continued

| | GRAMS |
|---|---|
| urea | 3.6 |
| silane | 0.54 |
| water | 6.82 |

The composition was prepared by weighing the water into a 100 ml. beaker and adding the ammonium sulfate thereto. The mixture was stirred to solution and to this solution there was then added in sequence, the aqueous dispersion, the urea and silane. The pH of the ultimate mixture was adjusted to 8.2 by the addition thereto of ammonium hydroxide. The composition was charged into a Hobart mixer which contained 582 grams of small glass beads (designated as P-93 Glass Spheres by the supplier, Cataphote Corp.). The materials were thoroughly mixed and the mixture then poured into a mold, having a number of dog-bone shaped cavities, which had been preheated in a 450°F oven. The filled mold was placed in the 450°F oven for 5 minutes. Test specimens were then removed from the mold, half placed in a desiccator and the other half placed in a humidity chamber wherein the relative humidity was 100% and the temperature was 120°F.

Binder content of each specimen was 3 percent by weight.

Specimens were aged and tested for tensile strength which is indicative of "bonding" strength, using a Baldwin Tensile Tester with the cross-head speed set at 0.2 inch per minute.

The silane used in the formulation had the following structure:

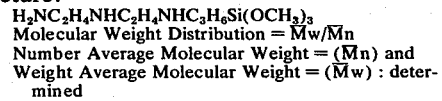
Molecular Weight Distribution = $\overline{M}w/\overline{M}n$
Number Average Molecular Weight = $(\overline{M}n)$ and
Weight Average Molecular Weight = $(\overline{M}w)$ : determined according to procedure described in J. Polymer Science, Part A, 2, 835, 1964 by J. Moore.

Particle Size of Resin in the Aqueous Dispersion - determined using a Coulter Counter.

EXAMPLE 1

Into a five-liter, round bottom flask, equipped with a reflux condenser, agitator, thermometer and heating mantle, there was charged 1200 grams of phenol, 1668 grams aqueous formaldehyde (40%), and a slurry of 30 grams of barium hydroxide monohydrate in 60 grams of water. The mixture was then heated to a temperature of 75°C., whereupon the heating mantle was removed and the mixture was allowed to reach a stage of atmospheric reflux through its exothermic heat of reaction. The mixture was then allowed to reflux for about forty-five minutes. At the end of the forty-five minute period, a water solution, made up of 24 grams of gum arabic, 6 grams of guar gum, and 720 grams of water, was added to the contents of the flask. After the addition of the gum there was then added, to the flask, a water solution, made up of 12 grams of sulfuric acid (96.6%) and 48 grams of water, to neutralize the barium hydroxide. The contents of the flask were then brought to a temperature of about 85°C. and maintained at this temperature for about 10 minutes. At the end of the 10 minute period, the contents of the reaction flask were cooled to a temperature of about 50°C. and discharged into a container as a resin-in-water dispersion having a solids content of 42 percent by weight.

Solids content of the aqueous dispersions, as noted in this specification, was determined by placing a weighed sample of the dispersion in a 300°F. oven for 2 hours and weighing the residue after the 2 hour period. Percent solids was calculated by dividing the weight of the residue by the weight of the sample and multiplying by 100.

| Properties of the phenol-formaldehyde resin: | |
| --- | --- |
| Mole ratio of reactants - formaldehyde to phenol | = 1.75 to 1 |
| Number average molecular weight | = 360 |
| Weight average molecular weight | = 760 |
| Molecular weight distribution | = 2.1 |
| Free phenol | = 6.2 percent by wt. |
| Amount of resin made up of one ring compounds | = 22 percent by wt. |
| Amount of resin made up of one and two ring compounds | = 46 percent by wt. |
| Gel time | = 75 seconds |
| Particle size (diameter) of the resin in the dispersion, on average | = 10 microns |
| Diameter of substantially all of particles of resin in the dispersion, less than | = 30 microns |

The particles were excellently dispersed in the aqueous medium, as determined by microscopic examination.

| | |
| --- | --- |
| pH of the aqueous dispersion | = 5.7 |
| Pollution Index of the aqueous dispersion | = 2.9 percent |

The aqueous dispersion had excellent stability characteristics - no visual settling of particles after two weeks storage at a temperature of about 23°C. Also, the dispersion could be infinitely diluted with water without significant change as to particle size.

| Glass Adhesion Test | |
| --- | --- |
| Average value of 6 test specimens (aged 1 hr. in desiccator) | = 700 psi |
| Average value of 6 test specimens (aged 16 hours in humidity chamber) | = 600 psi |

On the basis of 100 parts by weight phenol changed into the reaction flask, the amount of gum arabic in the dispersion was 2 parts by weight, and the amount of guar gum was 0.5 part by weight.

The guar gum noted in this and in subsequent examples is a commercial product sold by Stein-Hall under the designation Jaguar J2S1.

EXAMPLE 2

Into a five-liter, round bottom flask, equipped with a reflux condenser, agitator, thermometer and heating mantle, there was charged 720 grams of water, 24 grams of gum arabic, and 6 grams of guar gum. The materials were mixed for 15 minutes, and to the mixture there was then added 1200 grams of phenol, 1668 grams of aqueous formaldehyde (40%), and 48 grams of aqueous sodium hydroxide (25%). The mixture was then heated to a temperature of 75°C., whereupon the heating mantle was removed and the mixture was allowed to reach a stage of reflux through its exothermic heat of reaction. The mixture was then allowed to reflux for about forty-five minutes. At the end of the forty-five minute period, the reacted mixture was cooled to a temperature of 85°C., and an aqueous mixture, made up of 15.6 grams of aqueous phosphoric acid (85%) and 36 grams of water, was added. After 1.5 hours at a temperature of 85°C., the contents of the flask were discharged into a container as a resin-in-water dispersion having a solids content of 42.2 percent by weight.

| Properties of the phenol-formaldehyde resin: | |
| --- | --- |
| Mole ratio of reactants - formaldehyde to phenol | = 1.75 to 1 |
| Number average molecular weight | = 330 |
| Weight average molecular weight | = 1500 |
| Molecular weight distribution | = 4.5 |
| Gel time | = 76 seconds |

The size of the resin particles, dispersion thereof in the aqueous medium, and the stability and the dilutability characteristics of the aqueous dispersion were comparable to those of Example 1.

| | |
| --- | --- |
| pH of the aqueous dispersion | = 6.75 |
| Pollution Index of the aqueous dispersion | = 3.3 percent |

On the basis of 100 parts by weight phenol charged into the reaction flask, the amount of gum arabic used was 2 parts by weight, and the amount of guar gum was 0.5 part by weight.

EXAMPLE 3

The procedure of Example 1 was repeated using the materials and amounts as noted below. This example differs from Example 1 primarily in that a smaller amount of formaldehyde was used, sodium hydroxide was the catalyst, and phosphoric acid was the neutralizing agent.

|  | AMOUNT IN GRAMS |
|---|---|
| Phenol | 1200 |
| Formaldehyde (40% aqueous solution) | 1332 |
| Sodium hydroxide (25% aqueous solution) | 48 |
| Gum arabic | 24 |
| Guar gum | 6 |
| Water | 720 |
| Phosphoric acid (85%) | 15.6 |
| Water | 36 |

Solids content of the resin-in-water dispersion was 45.6 percent by weight.

| Properties of the phenol-formaldehyde resin: | |
|---|---|
| Mole ratio of reactants- formaldehyde to phenol | = 1.40 to 1 |
| Number average molecular weight | = 380 |
| Weight average molecular weight | = 990 |
| Molecular weight distribution | = 2.6 |
| Gel time | = 58 seconds |

The size of the resin particles, dispersion thereof in the aqueous medium, and the stability and dilutability characteristics of the aqueous dispersion were comparable to those of Example 1.

| pH of the aqueous dispersion | = 6.5 |
|---|---|
| Pollution Index of the aqueous dispersion | = 2.8 percent |

On the basis of 100 parts by weight phenol charged into the reaction flask, the amount of gum arabic used was 2 parts by weight, and the amount of guar gum was 0.5 part by weight.

EXAMPLE 4

The procedure of Example 1 was repeated using the materials and amounts noted below. This example differs from Example 1 primarily in that a larger amount of formaldehyde was used, sodium hydroxide was the catalyst, and phosphoric acid was the neutralizing agent.

|  | AMOUNT IN GRAMS |
|---|---|
| Phenol | 1100 |
| Formaldehyde (40% aqueous solution) | 1760 |
| Sodium hydroxide (25% aqueous solution) | 44 |
| Gum arabic | 22 |
| Guar gum | 5.5 |
| Water | 660 |
| Phosphoric acid (85%) | 14.3 |
| Water | 33 |

The solids content of the resin-in-water dispersion was 42.3 percent by weight.

| Properties of the phenol-formaldehyde resin: | |
|---|---|
| Mole ratio of reactants - formaldehyde to phenol | = 2.01 to 1 |
| Number average molecular weight | = 340 |
| Weight average molecular weight | = 850 |
| Molecular weight distribution | = 2.5 |
| Gel Time | = 59 seconds |

The size of the resin particles, dispersion thereof in the aqueous medium, and the stability and dilutability characteristics of the aqueous dispersion were comparable to those of Example 1.

| pH of the aqueous dispersion | = 6.6 |
|---|---|
| Pollution Index of the aqueous dispersion | = 3.7 percent |

On the basis of 100 parts by weight phenol charged into the reaction flask, the amount of gum arabic used was 2 parts by weight, and the amount of guar gum was 0.5 part by weight.

EXAMPLE 5

The procedure of Example 1 was repeated using the materials and amounts noted below. This example differs from Example 1 primarily in that sodium hydroxide was used as the catalyst and hydrochloric acid was used as the neutralizing agent.

|  | AMOUNT IN GRAMS |
|---|---|
| Phenol | 1200 |
| Formaldehyde (40% aqueous solution) | 1668 |
| Sodium hydroxide (25% aqueous solution) | 48 |
| Gum arabic | 24 |
| Guar gum | 6 |
| Water | 720 |
| Hydrochloric acid (37%) | 19 |

-continued

| | AMOUNT IN GRAMS |
|---|---|
| Water | 58 |
| Solids content of resin-in-water dispersion | = 41% by weight |

Properties of the phenol-formaldehyde resin:

| Mole ratio of reactants - formaldehyde to phenol | = 1.75 to 1 |
|---|---|
| Number average molecular weight | = 370 |
| Weight average molecular weight | = 1190 |
| Molecular weight distribution | = 3.2 |
| Gel time | = 62 seconds |

The size and uniformity of the resin particles, dispersion thereof in the aqueous medium, and the stability of the aqueous dispersion were comparable to those of Example 1.

| pH of the aqueous dispersion | = 6.7 |
|---|---|
| Pollution Index of the aqueous dispersion | = 3.5 percent |

On the basis of 100 parts by weight phenol charged into the reaction flask, the amount of gum arabic used was 2 parts by weight, and the amount of guar gum was 0.5 part by weight.

EXAMPLES 6–8

The procedure of Example 1 is repeated, using in each instance, various amounts of gum arabic and guar gum. Amounts used, in parts by weight, based on 100 parts by weight of phenol that are charged into the reaction flask, are noted below:

| Example 6 | gum arabic | - 10 |
|---|---|---|
| | guar gum | - 0.5 |
| Example 7 | gum arabic | - 1 |
| | guar gum | - 0.5 |
| Example 8 | gum arabic | - 0.5 |
| | guar gum | - 0.5 |

Properties of these dispersions are comparable to the properties of the dispersion of Example 1.

EXAMPLE 9

The procedure of Example 1 was repeated using the materials and amounts noted below. This example differs from Example 1 primarily in that a mixture of phenol and p-nonylphenol was used.

| | AMOUNT IN GRAMS |
|---|---|
| Phenol | 360 |
| p-Nonylphenol | 40 |
| Formaldehyde (40% aqueous solution) | 520 |
| Barium hydroxide monohydrate | 10 |

-continued

| | AMOUNT IN GRAMS |
|---|---|
| Gum arabic | 2 |
| Guar gum | 3 |
| Water | 270 |
| Sulfuric acid (96.6%) | 3.33 |
| Water | 13 |

The solids content of the resin-in-water dispersion was 42.1 percent by weight.

Properties of the phenol-formaldehyde resin:

| Mole ratio of reactants - formaldehyde to phenol | = 1.75 to 1 |
|---|---|
| Number average molecular weight | = 410 |
| Weight average molecular weight | = 1440 |
| Molecular weight distribution | = 3.5 |
| Gel time | = 60 seconds |

The size of the resin particles, dispersion thereof in the aqueous medium, and the stability and dilutability characteristics of the aqueous dispersion were comparable to those of Example 1.

| pH of the aqueous dispersion | = 6.4 |
|---|---|
| Pollution Index of the aqueous dispersion | = 3.2 percent |

Glass Adhesion Test

| Average value of 6 test specimens (aged 1 hr. in desiccator) | = 600 psi |
|---|---|
| Average value of 6 test specimens (aged 16 hrs. in humidity chamber) | = 625 psi |

The formulation of the composition tested using the aqueous dispersion of this example was as follows:

| | GRAMS |
|---|---|
| Aqueous dispersion | 33.73 |
| Ammonium sulfate | 0.2 |
| Urea | 3.6 |
| Silane | 0.54 |
| Water | 7.4 |

Amounts of glass beads used was 582 grams and the resin content of each composite or structure produced was 3 percent by weight.

On the basis of 100 parts by weight "phenols" charged into the reaction flask, the amount of gum arabic used was 0.5 parts by weight, and the amount of guar gum was 0.75 part by weight.

EXAMPLE 10

Example 1 is repeated with the exception that the mole ratio of formaldehyde to phenol is 1.89 to 1, and in lieu of the gums of Example 1, the following gums are used, in the amounts noted, based on 100 parts by weight of phenol charged:

2 parts by weight gum arabic 1 part by weight gum carageenan

The gum carageenan of this example was obtained from Marine Colloids, Inc. under the trade designation "Viscarin 402."

| Properties of the phenol-formaldehyde resin: | |
| --- | --- |
| Mole ratio of reactants - formaldehyde to phenol | = 1.89 to 1 |
| Number average molecular weight | = 310 |
| Weight average molecular weight | = 870 |
| Molecular weight distribution | = 2.8 |
| Gel time | = 145 seconds |
| Solids content of resin-in-water dispersion | = 45% by weight |

The size of the resin particles, dispersion thereof in the aqueous medium, and the stability and dilutability characteristics of the aqueous dispersion are comparable to those of Example 1.

| pH of the aqueous dispersion | = 5.4 |
| --- | --- |
| Pollution Index of the aqueous dispersion | = 3.4 percent |

EXAMPLE 11

Example 1 was repeated using, in lieu of the guar gum, locust bean gum in the same weight relationship.

| Properties of the phenol-formaldehyde resin: | |
| --- | --- |
| Mole ratio of reactants - formaldehyde to phenol | = 1.75 to 1 |
| Number average molecular weight | = 420 |
| Weight average molecular weight | = 1930 |
| Molecular weight distribution | = 4.6 |
| Gel time | = 75 seconds |
| Solids content of resin-in-water dispersion | = 41% by weight |

The size of the resin particles, dispersion thereof in the aqueous medium, and the stability and dilutability characteristics of the aqueous dispersion were comparable to those of Example 1.

| pH of the aqueous dispersion | = 5.5 |
| --- | --- |
| Pollution Index of the aqueous dispersion | = 3.5 percent |

EXAMPLE 12

Example 1 was repeated using, in lieu of the guar gum of Example 1, Jaguar 1212A, a guar gum obtained from Stein-Hall, in the same weight relationship.

| Properties of the phenol-formaldehyde resin: | |
| --- | --- |
| Mole ratio of reactants - formaldehyde to phenol | = 1.75 to 1 |
| Number average molecular weight | = 410 |
| Weight average molecular weight | = 1760 |
| Molecular weight distribution | = 4.3 |
| Gel time | = 80 seconds |
| Particle size (diameter) of the resin in the dispersion, on average | = 15 microns |
| Diameter of substantially all of the particles of the resin in the dispersion | = 30 microns |
| Solids content of resin-in-water dispersion | = 41% by weight |

The size of the resin particles, dispersion thereof in the aqueous medium, and the stability and dilutability characteristics of the aqueous dispersion were comparable to those of Example 1.

| pH of the aqueous dispersion | = 5.75 |
| --- | --- |
| Pollution Index of the aqueous dispersion | = 3.4 percent |

EXAMPLE 13

The procedure of Example 1 was repeated using the materials and amounts thereof as noted below.

| | AMOUNT IN GRAMS |
| --- | --- |
| Phenol | 1200 |
| Formaldehyde (40% aqueous solution) | 1332 |
| Barium hydroxide monohydrate | 30 |
| Gum arabic | 24 |
| Guar gum | 6 |
| Sulfuric acid (20%) | 63 |
| Water | 792 |

Solids content of the resin-in-water dispersion was 41 percent by weight.

| Properties of the phenol-formaldehyde resin: | |
| --- | --- |
| Mole ratio of reactants - formaldehyde to phenol | = 1.4 to 1 |
| Number average molecular weight | = 330 |
| Weight average molecular weight | = 857 |
| Molecular weight distribution | = 2.6 |
| Free phenol | = 11.9 percent |

-continued

| Properties of the phenol-formaldehyde resin: | |
|---|---|
| Amount resin made up of one ring compounds | = 31 percent |
| Amount of resin made up of one and two ring compounds | = 56 percent |
| Gel time | = 132 seconds |

The size of the resin particles, dispersion thereof in the aqueous medium, and the stability and dilutability characteristics of the aqueous dispersion were comparable to those of Example 1.

| pH of the aqueous dispersion | = 5.0 |
|---|---|
| Pollution Index of the aqueous dispersion | = 3.2 percent |

EXAMPLE 14

Into a five-liter, round bottom flask, equipped with a reflux condenser, agitator, thermometer and heating mantle, there was charged 1200 grams of phenol, 1332 grams aqueous formaldehyde (40%), 30 grams of barium hydroxide monohydrate, 24 grams of gum arabic, and 6 grams of guar gum. The resultant mixture was then heated to a temperature of about 75°C., whereupon the heating mantle was removed and the mixture was allowed to reach a stage of atmospheric reflux through its exothermic heat of reaction. The mixture was then allowed to reflux for about 35 minutes. At the end of the 35 minute period, 792 grams of water were added to the contents of the flask. To the flask, there was then added 61 grams of aqueous sulfuric acid (20%), and the contents of the flask were brought to a temperature of 85°C. and were maintained at this temperature for about 95 minutes. At the end of this period, the contents of the flask were cooled below about 50°C. and were then discharged into a container as a resin-in-water dispersion having a solids content of 42 percent by weight.

| Properties of the phenol-formaldehyde resin: | |
|---|---|
| Mole ratio of reactants - formaldehyde to phenol | = 1.40 to 1 |
| Number average molecular weight | = 350 |
| Molecular weight distribution | = 3.96 |
| Weight average molecular weight | = 1390 |
| Amount of resin made up of one ring compounds | = 29 percent |
| Amount of resin made up of one and two ring compounds | = 52 percent |
| Gel time | = 125 seconds |

The size of the resin particles, dispersion thereof in the aqueous medium, and the stability and dilutability characteristics of the aqueous dispersion were comparable to those of Example 1.

| pH of the aqueous dispersion | = 5.3 |
|---|---|
| Pollution Index of the aqueous dispersion | = 3.4 percent |

EXAMPLE 15

Into a 12-liter reaction flask, equipped with a reflux condenser, thermometer and agitator, there was charged 3000 grams of phenol, 3000 grams of aqueous formaldehyde (40%), and 180 grams of hexamethylenetetramine. The resultant mixture was heated to a temperature of 80°C. under a pressure of 16–17 mm of Hg, and held at 80°C. for about 25 minutes. At the end of the 25 minute period, 60 grams of gum arabic, 15 grams of guar gum, and 1800 grams of water were added to the flask in the order recited. The reaction mixture was held at a temperature of 85°C. until the gel time of the product was about 60 seconds. At this point, 120 grams of hexamethylenetetramine were added to the flask, and the reaction continued at a temperature of 85°C. to a product gel time of 25 seconds. The content of the flask were cooled rapidly to below a temperature of 50°C., and were discharged into a container as a resin-in-water dispersion having a solids content of 42 percent by weight.

| Properties of the phenol-formaldehyde resin: | |
|---|---|
| Mole ratio of reactants - formaldehyde to phenol | = 1.26 to 1 |
| Number average molecular weight | = 340 |
| Weight average molecular weight | = 723 |
| Molecular weight distribution | = 2.13 |
| Amount of resin made up of one ring compounds | = 29.5 percent by wt. |
| Amount of resin made up of one and two ring compounds | = 53.0 percent by wt. |
| Gel time | = 25 seconds |

The size of the resin particles, dispersion thereof in the aqueous medium and the stability and dilutability characteristics of the aqueous dispersion were comparable to those of Example 1.

| pH of the aqueous dispersion | = 7.6 |
|---|---|
| Pollution Index of the aqueous dispersion | = 2.0 |

EXAMPLE 16

This example illustrates the use of the aqueous dispersions of the invention in the preparation of cellulosic products.

To a mixture of 65 grams of kraft paper pulp, 85 grams of the aqueous dispersion of Example 1, and 10,000 grams of water, there was added sufficient alum to adjust the pH thereof to 4.5. The resin-pulp mixture was then collected on a 100 mesh screen to form a sheet, and was then dried at room temperature to a moisture content of about 8 percent. The dried sheet was then hot pressed for 5 minutes at a pressure of 500 psig, using platens which had been preheated to a temperature of 420°F.

A hard, rigid board was obtained, evidence of excellent bonding of the paper pulp fibers by the phenolic resin.

CONTROL 1

The procedure of Example 1 was repeated using as the sole "gum", gum arabic. The actual materials used and amounts thereof are noted below.

|  | AMOUNT IN GRAMS |
|---|---|
| Phenol | 1200 |
| Formaldehyde (40% aqueous solution) | 1668 |
| Sodium hydroxide (25% aqueous solution) | 48 |
| Gum arabic | 36 |
| Water | 480 |
| Phosphoric acid (85%) | 15.6 |
| Water | 36 |

The solids content of the resin-in-water dispersion was 44 percent by weight.

| Gel time | = 42 seconds |
|---|---|

Particles of the resin were undesirably large and non-uniform, stability was poor, and the particles settled out rapidly.

On the basis of 100 parts by weight phenol charged into the reaction flask, the amount of gum arabic used was 3 parts by weight.

CONTROL 2

The procedure of Example 1 was repeated using as the sole gum, guar gum. The actual materials used and amounts thereof are noted below:

|  | AMOUNT IN GRAMS |
|---|---|
| Phenol | 1200 |
| Formaldehyde (40% aqueous solution) | 1668 |
| Barium hydroxide monohydrate | 30 |
| Guar gum | 12 |
| Water | 920 |
| Sulfuric acid (96.6%) | 10 |
| Water | 40 |

This formulation resulted in a water-in-resin dispersion rather than a resin-in-water dispersion. Consequently, the composition obtained could not be diluted with water and used in spray coating applications.

On the basis of 100 parts by weight phenol charged into the reaction flask, the amount of guar gum used was 1 percent by weight.

CONTROL 3

Example 1 is repeated with the exception that 20 parts by weight gum arabic are used, based on 100 parts of phenol charged.

Diluting the dispersion to 10% by weight, on a solids basis, results in a rapid settling out of the particles.

CONTROL 4

Example 4 is repeated with the exception that no "gums" are used. No dispersion forms.

The term "infinitely dilutable" as used herein means that the aqueous dispersions can be diluted to a solids content of 1 percent by weight with no substantial change in the size and uniformity of the dispersed resin particles therein.

What is claimed is:

1. Organic or inorganic fibers bonded by the cured product of an aqueous dispersion containing dispersed particles of a heat-hardening resole phenolic resin in water and containing gum arabic and at least one of the following gums: a polysaccharide consisting essentially of mannose and galactose units, a polysaccharide consisting essentially of D-mannuronic and L-guluronic acid units, and gum carageenan, wherein the combined weight of the recited gums is about 0.5 to about 12 parts by weight per 100 parts by weight phenol used in producing the phenolic resin, and the weight ratio of the gum arabic to the other recited gum is about 0.5 to about 20 to 1, wherein said aqueous dispersion is stable for a period of time in excess of about two weeks, and wherein said aqueous dispersion is infinitely dilutable with water.

2. The bonded fibers of claim 1 wherein said fibers are mineral fibers.

3. The bonded fibers of claim 1 wherein said fibers are cellulosic.

4. The bonded fibers of claim 1 wherein said fibers are glass.

5. The bonded fibers of claim 1 wherein said fibers are slag.

* * * * *